US012077039B2

(12) United States Patent
Marquart

(10) Patent No.: US 12,077,039 B2
(45) Date of Patent: Sep. 3, 2024

(54) GLASS ROOF ARRANGEMENT FOR A MOTOR VEHICLE

(71) Applicant: BOS GmbH & Co. KG, Ostfildern (DE)

(72) Inventor: Marius Marquart, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 17/854,445

(22) Filed: Jun. 30, 2022

(65) Prior Publication Data

US 2023/0001774 A1    Jan. 5, 2023

(30) Foreign Application Priority Data

Jul. 5, 2021   (DE) .......................... 102021207033.7

(51) Int. Cl.
*B60J 7/00* (2006.01)
*B62D 25/06* (2006.01)

(52) U.S. Cl.
CPC ............ *B60J 7/0007* (2013.01); *B62D 25/06* (2013.01)

(58) Field of Classification Search
CPC ... B60J 7/00; B60J 7/0007; B60J 7/003; B60J 7/0015; B60J 1/2052; B60J 10/50; B60J 10/82; B62D 25/06; B62D 29/00; B62D 29/001; B62D 29/005; B62D 27/02; B62D 27/026; B60R 11/00; B60R 11/0028; B60R 13/02; B60R 13/0212

(Continued)

(56) References Cited

U.S. PATENT DOCUMENTS 4,611,848 A * 9/1986 Romano ................... B60J 7/068
                                                    296/100.09
6,817,658 B2 * 11/2004 Ohnishi .................. B60J 7/024
                                                    296/213

(Continued)

FOREIGN PATENT DOCUMENTS

CN        1453159 A     11/2003
CN      203681223 U      7/2014

(Continued)

OTHER PUBLICATIONS

Jeon Byeong Yun, "Apparatus for Fixing Side of Roller Blind", Published: Apr. 1, 2015, Publisher: European Patent Office, Publication: KR20150073648A (Year: 2015).*

(Continued)

*Primary Examiner* — Jason S Daniels
(74) *Attorney, Agent, or Firm* — FLYNN THIEL, P.C.

(57) ABSTRACT

A glass roof arrangement, having a support frame fixedly connected to roof structure parts of a vehicle body. At least one transparent roof panel is fixedly arranged on the support frame, and a shading device is assigned to the underside of the roof panel and has a shading structure displaceable longitudinally in guide rails fastened to an underside of the roof panel. A guide profile cross-section of each guide rail is formed from an edge limb supported substantially orthogonally on the underside of the roof panel, and a guide limb extends substantially parallel to the underside and is attached to the edge limb such that a lateral guide channel for the shading structure is formed and delimited by the underside of the roof panel, the edge limb, and the guide limb.

16 Claims, 2 Drawing Sheets

(58) Field of Classification Search
USPC .............................. 296/210, 213, 214, 216.08
See application file for complete search history.

(56) References Cited

U.S. PATENT DOCUMENTS

| | | | |
|---|---|---|---|
| 8,827,588 B2 * | 9/2014 | Inaba | F16B 5/0657 |
| | | | 411/523 |
| 9,205,729 B2 | 12/2015 | Hiramatsu et al. | |
| 9,994,093 B2 * | 6/2018 | Rikkert | B60J 1/2052 |
| 11,845,323 B2 * | 12/2023 | Inzerillo | B60J 7/0015 |
| 2003/0146650 A1 | 8/2003 | Paul et al. | |
| 2003/0151275 A1 | 8/2003 | Ohnishi et al. | |
| 2021/0146760 A1 | 5/2021 | Riegger et al. | |

FOREIGN PATENT DOCUMENTS

| | | | | |
|---|---|---|---|---|
| CN | 112368163 A | | 2/2021 | |
| CN | 112424007 A | | 2/2021 | |
| CN | 112810414 A | | 5/2021 | |
| DE | 102010040603 A1 | * | 3/2012 | ............ B60J 1/2011 |
| DE | 102011081348 A2 | * | 2/2013 | ............ B60J 7/0015 |
| EP | 3196102 A1 | * | 7/2017 | ............ B60J 7/0015 |
| JP | 20131217 A | | 1/2013 | |
| KR | 101444941 B1 | * | 9/2014 | ............ B60J 7/043 |
| KR | 20150073648 A | * | 4/2015 | ............ B60J 7/0015 |

OTHER PUBLICATIONS

Jeon Byeong Yun, "A Apparatus for Fixing Side of Roller Blind", Published: Sep. 30, 2014, Publisher: European Patent Office, Edition: KR101444941B1 (Year: 2014).*
Wolfgang et al, "Roof window unit and vehicle with a roof window unit", Published: Feb. 28, 2013, Publisher: German Patent Office, Edition: DE102011081348A2 (Year: 2013).*
Boch et al., "Shading device for a glazed vehicle opening", Published: Mar. 15, 2012, Publisher: German Patent Office, Edition: DE102010040603A1 (Year: 2012).*
German Office Action issued in corresponding German Application No. 10 2021 207 033.7 date of mailing Mar. 24, 2022 (4 pages).
Chinese Office Action with partial English translation issued in corresponding Chinese Application No. 202210782768.3 dated Apr. 27, 2024 (10 pages).

* cited by examiner

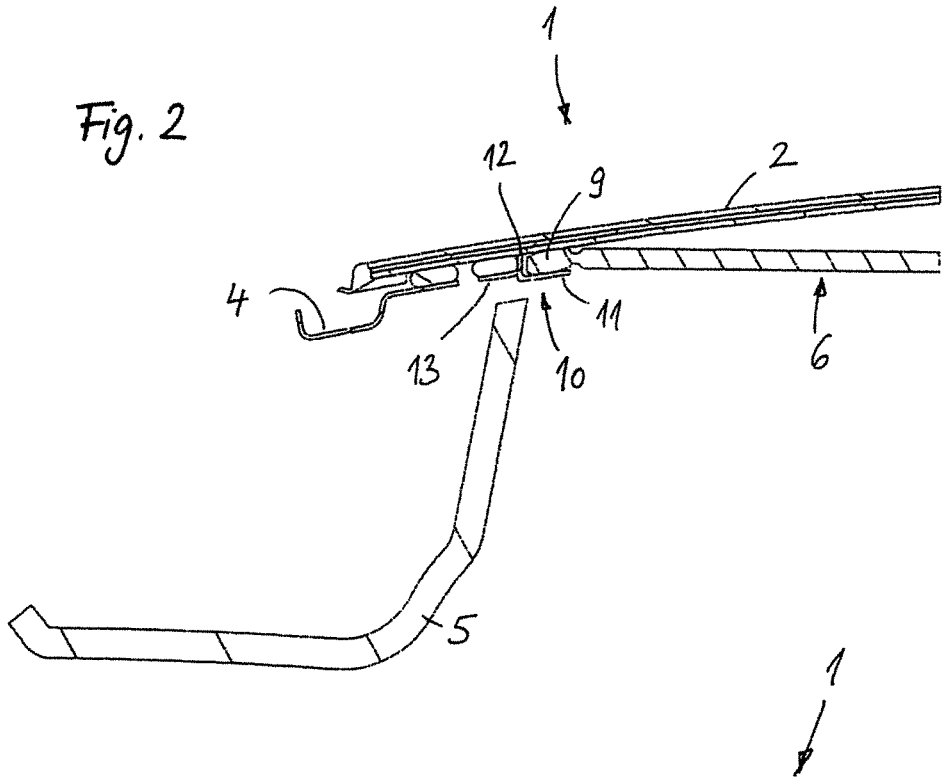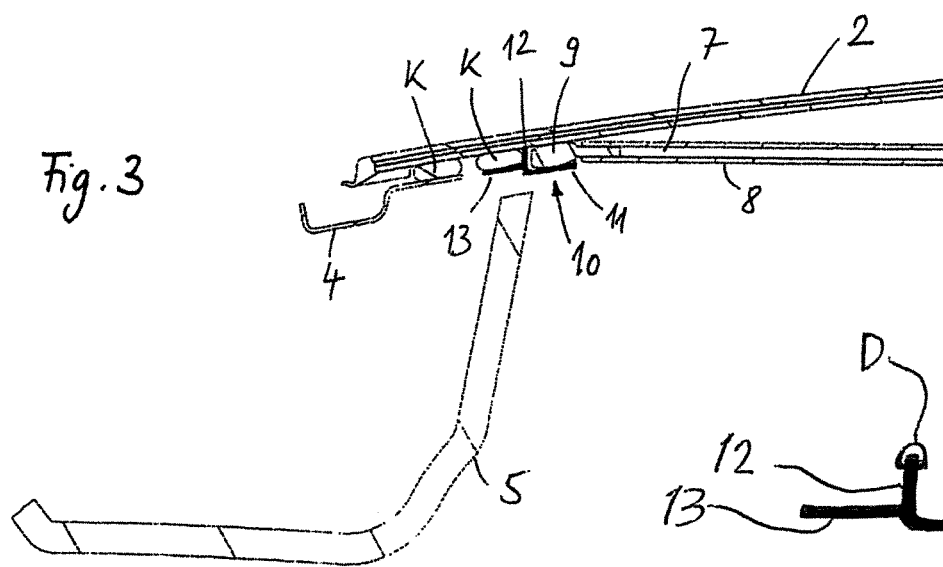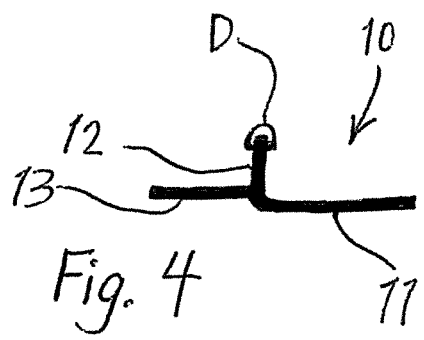

GLASS ROOF ARRANGEMENT FOR A MOTOR VEHICLE

CROSS REFERENCE TO RELATED APPLICATION

This claims priority from German Application No. 10 2021 207 033.7, filed Jul. 5, 2021, the disclosure of which is hereby incorporated by reference in its entirety.

TECHNICAL FIELD

The invention relates to a glass roof arrangement for a motor vehicle, having a support frame. The support frame, in the operating state, in which the support frame is mounted in a manner fixed on the vehicle, is fixedly connected to roof structure parts of a vehicle body. At least one transparent roof panel is fixedly arranged on the support frame, and has a shading device assigned to the underside of the at least one roof panel. The shading device has a shading structure displaceable longitudinally in guide rails, and the guide rails are fastened to an underside of the at least one roof panel.

BACKGROUND AND SUMMARY

Such a glass roof arrangement is generally known in passenger cars. A transparent roof panel is fastened to a support frame, which in turn is fixedly connected to corresponding roof body portions of the vehicle body of the passenger car. For shading the transparent roof panel, a shading structure is provided, which, for displacement between a rest position and a shading position, is guided longitudinally displaceably in guide rails in the region of an underside of the roof panel. The guide rails are positioned in the region of opposite side edges of the shading structure and have a C-shaped channel profile. One C-limb of the channel profile is bonded face-to-face to the underside of the transparent roof panel. Guide slides of a pull-out profile of the shading structure are displaceably mounted in the C-shaped channel profile.

The invention provides a glass roof arrangement of the type mentioned at the outset, which enables improved usability of the ceiling height in a vehicle interior.

A guide profile cross-section of each guide rail, in which the shading structure is guided laterally in each case, is formed from an edge limb. The edge limb is attached at least largely orthogonally to the underside of the roof panel, and a guide limb, which extends at least largely parallel to the underside and is attached to the edge limb, in such a way that a lateral guide channel for the shading structure is formed and delimited by the underside of the roof panel, the edge limb, and the guide limb. According to one aspect of the invention, the edge limb of the guide profile cross-section of the guide rail either sits butted directly against the underside of the roof panel, so that the corresponding end edge of the edge limb directly contacts the underside of the roof panel, or the edge limb is positioned at a small distance of about one to three tenths of a millimeter from the underside of the roof panel. In the case of direct contact, the edge limb is advantageously provided with a soft material, such as plastic in particular, in the region of its edge facing the underside of the roof panel, in order to avoid unpleasant scraping or squeaking noises at the contact point during driving operation of the motor vehicle. The guide profile cross-section remains the same over the length of the guide rail, the guide rail being understood to mean merely the length portion over which the shading structure is displaceable between a rest position, exposing the roof panel, and a shading position, shading the roof panel from below. The at least one transparent roof panel is made of a transparent, dimensionally rigid roofing material, which is manufactured as a glass composite material, as a transparent plastic, or the like. Accordingly, the term 'glass roof arrangement' is also not intended to mean that the roof arrangement is made of glass. Rather, the term 'glass roof arrangement' is intended to make clear that the roof arrangement is transparent to allow light radiation to pass through. The term 'transparent design of the roof panel' is intended to mean any type of light transmission. This means that the transparent roof panel can be tinted, or in edge portions can be impermeable to light, matte transparent, opaque or similarly designed. The solution according to one aspect of the invention reduces the overall height of the guide rail for the shading structure compared to known guide rails, since no channel limb of the guide rail is used as the top channel wall for guiding the shading structure, but rather directly the underside of the roof panel. The reduced overall height of the guide rail allows additional installation space in the upward direction of a vehicle interior, which can be used advantageously for the appropriate design of the vehicle interior. The solution according to one aspect of the invention is particularly advantageous for passenger cars designed as electric vehicles, in which battery charges in the region of a floor of the vehicle body can lead to a reduced height of the vehicle interior.

In an embodiment of the invention, each guide rail has an adhesive limb which projects from the edge limb in the opposite direction to the guide limb and is positioned at a distance from the underside of the roof panel. By means of the adhesive limb, which is spaced from the underside of the roof panel, bonding to the underside of the roof panel can be effected without a corresponding adhesive layer increasing the overall height of the guide rail. This is because, in contrast to the prior art, an adhesive layer preferably applied by an adhesive bead is not provided at the guide channel for the shading structure, but rather is offset laterally outward. For this purpose, the adhesive limb is advantageously spaced apart from the underside of the roof panel in order to create space for a corresponding adhesive layer between the adhesive limb and the underside of the roof panel. Advantageously, the distance of the adhesive limb from the underside of the roof panel is such that a gap is formed to accommodate an adhesive bead. The adhesive layer formed by the adhesive bead is thus positioned laterally outside the guide channel for the shading structure. In addition, the adhesive limb of the guide profile cross-section of the guide rail is spaced from the underside of the roof panel to form the gap for the adhesive layer. The height of the guide rail in the state bonded to the underside of the roof panel is thus defined exclusively by the height of the edge limb of the guide profile cross-section of the guide rail. The adhesive limb, the edge limb and the guide limb of the guide rail are designed as a one-piece longitudinal profile, either made of a light metal alloy or of a suitable plastics material, and preferably produced by extrusion as an endless profile.

In a further embodiment of the invention, the distance of the adhesive limb to the underside of the roof panel is less than a distance of the guide limb to the underside of the roof panel. Thus, the adhesive limb and the guide limb of the guide profile cross-section of each guide rail are offset relative to each other in the upward direction. On the one hand, this increases a rigidity of the corresponding longitudinal profile of the guide rail formed by the edge limb, the guide limb and the adhesive limb. On the other hand, this arrangement, which is offset in height, is adapted to the different requirements needed for the height of the guide channel for the shading structure on the one hand and for the height of the adhesive bead for fastening the guide rail to the underside of the roof panel on the other hand. The thickness of the adhesive bead in the cured adhesive position is preferably somewhat greater than the distance between the adhesive limb and the underside of the roof panel, so that the edge limb is positioned at a smaller distance of about one to three tenths of a millimeter from the underside of the roof panel.

In a further embodiment of the invention, the guide rail consists of plastic, at least in portions. In this case, the guide rail can be produced from a fiber-reinforced plastics material or by multi-component extrusion from a multi-component plastic. Preferably, when the guide rail is produced from a multi-component plastic, the edge limb is produced from an elastic plastics material at least in its edge region facing the underside of the roof panel, so that contact of this edge region with the underside of the roof panel cannot lead to unpleasant noises during driving operation of the motor vehicle.

In a further embodiment of the invention, the edge limb is provided with an elastically flexible damping material at least in its edge region facing the underside of the roof panel. The elastically flexible damping material can either be produced by one-piece manufacture in the manufacturing process of the guide rail, or the damping material can be subsequently applied to the edge limb and connected to the edge limb in a frictionally engaged, form-fitting or integrally bonded manner. The damping material thus forms a spacer so that a dimensionally rigid and hard portion of the edge limb does not lie directly against the underside of the roof panel in the assembled operating state.

Further advantages and features of the invention will become clear from the claims and from the following description of a preferred embodiment of the invention, which is presented with reference to the drawings.

BRIEF DESCRIPTION OF THE DRAWINGS

FIG. 2 shows, in an enlarged view, a cross-section along line of section II-II through a subregion of the glass roof arrangement according to FIG. 1;

FIG. 3 shows the illustration according to FIG. 2, but in which the shading structure is shown in somewhat more detail; and FIG. 4 is an enlarged and isolated cross-sectional view of the guide rail, diagrammatically illustrating damping material located at the end face of the edge limb.

DETAILED DESCRIPTION

Figure 1:
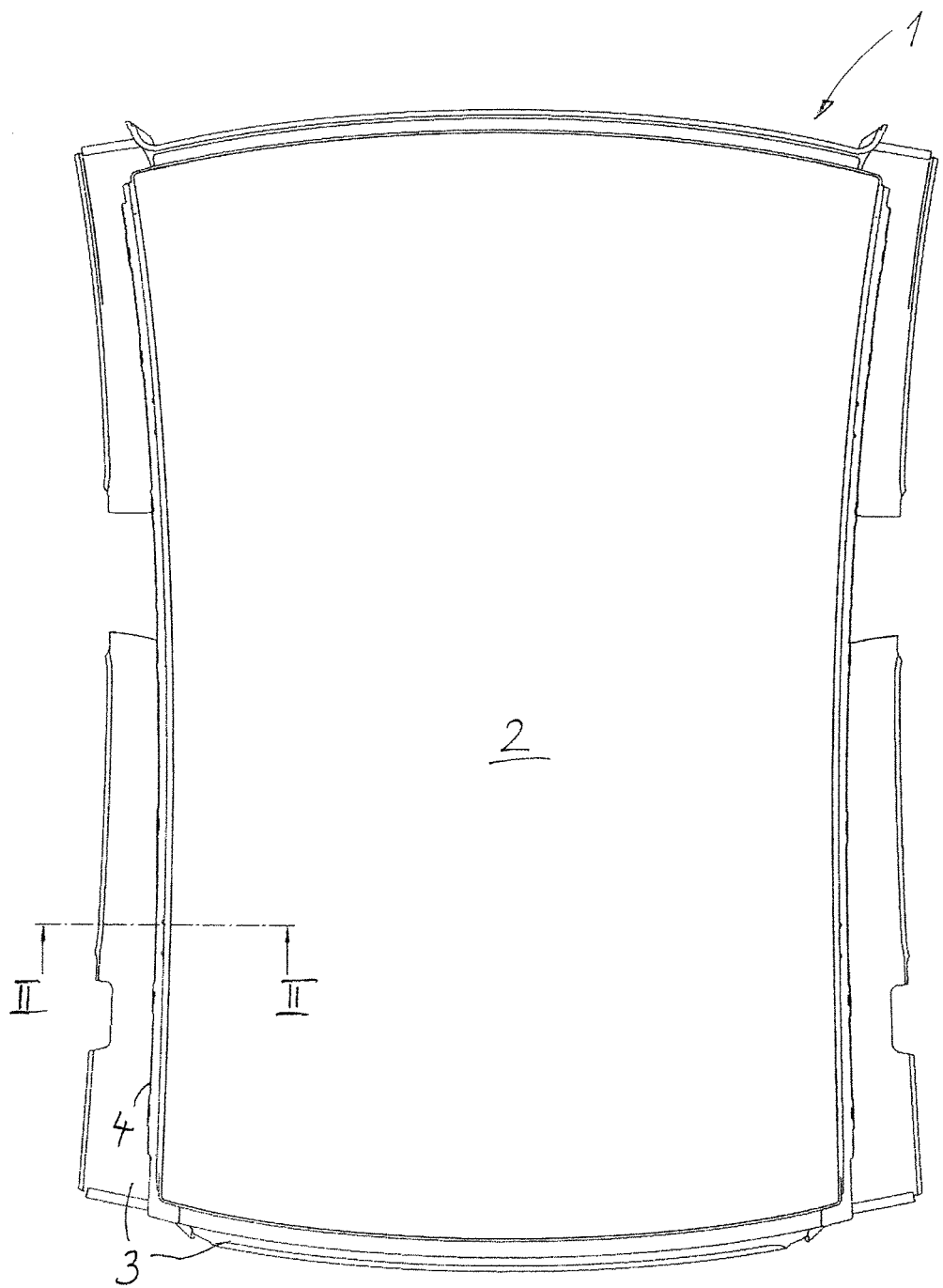
FIG. 1 shows a plan view of an embodiment of a glass roof arrangement for a passenger car according to the invention.

According to FIGS. 1 to 3, a glass roof arrangement 1 for a passenger car has a transparent roof panel 2, which is fixedly connected on the underside in the region of its peripheral edge to a dimensionally stable support frame 3, 4. As can be seen from FIGS. 2 and 3, the roof panel 2 is bonded at the edge in the region of its underside to support profile portions 4 which are parts of the support frame 3, 4. On the basis of FIGS. 2 and 3, a headliner portion 5 of a vehicle interior is also additionally indicated and is intended to cover lateral roof frame regions of the vehicle body that are not shown. The lateral roof frame portions are roof structure parts of the vehicle body in the sense of the invention. The support frame 3, 4 is fixedly connected to corresponding roof structure parts of the vehicle body in the ready-for-use assembled state.

It can be seen from FIGS. 2 and 3 that a shading structure 6 of a shading device is associated with the roof panel 2 in the region of its underside. The shading structure has a flexible shading web 8, which is held in a manner not shown so that it can be wound onto and unwound from a roller shaft. The roller shaft is mounted in the region of the support frame 3, 4 so as to be rotatable about an axis of rotation extending in the transverse direction of the vehicle. In a rest position, in which the underside of the roof panel 2 is exposed, the shading web 8 is wound at least almost completely onto the roller shaft. In a shading position, in which the shading web 8 covers the underside of the roof panel 2 in the longitudinal direction of the vehicle and in the transverse direction of the vehicle, the shading web 8 is extended and stretched over its surface. The shading web 8 has a flexible design and is preferably made of a textile sheet material, in particular a textile knitted fabric.

At a front end region in the pull-out direction, the shading web 8 is connected to a dimensionally stable pull-out profile 7, which extends across the width of the shading web 8 in the transverse direction. FIG. 3 shows that the shading web 8 is folded around the extension profile 7. This ensures a particularly intimate and high-quality connection between the extension profile 7 and the shading web 8. The pull-out profile 7 has, at each of its opposite end faces, a guide slider 9 which is inserted into an open side of the pull-out profile 7, which is embodied as a hollow profile, and is fixedly connected to the pull-out profile 7. The guide slider 9 is slidably guided on the opposite longitudinal sides of the shading web 8 in a guide rail 10 in each case, wherein only one guide rail 10 is shown on the basis of FIGS. 2 and 3. The opposite guide rail 10 is mirror-symmetrical to a vertical vehicle center longitudinal plane, but otherwise is of identical design.

The guide rail 10 is formed by a dimensionally stable longitudinal profile made of a light metal alloy or a suitable plastics material. The guide rail 10 has a guide limb 11, which faces the vehicle interior, is spaced at least largely parallel to the underside of the roof panel 2, and can be seen in cross-section in FIGS. 2 and 3. The guide limb 11 projects in one piece from an edge limb 12 pointing approximately at right angles in the direction of the underside of the roof panel 2. In addition, an adhesive limb 13 is provided, which also projects in one piece from the edge limb 12, but in the opposite direction to the guide limb 11. In addition, the distance of the adhesive limb 13 from the underside of the roof panel 2 is less than the distance of the guide limb 11 from the underside of the roof panel 2. The adhesive limb 13 and the guide limb 11 are oriented parallel to one another. All three limbs, i.e. the edge limb 12, the guide limb 11 and the adhesive limb 13, are embodied as rectilinear ribs and form integral portions of the one-part longitudinal profile which constitutes the guide rail 10.

As can be seen from FIGS. 2 and 3, the edge limb 12 is fitted in a manner butted against the surface of the underside of the roof panel 2. In this case, the edge limb 12 is supported on the underside of the roof panel 2 by its upwardly pointing, longitudinal end face or edge region, so that this end face or edge region of the edge limb 12 directly contacts the underside of the roof panel 2 in a linear manner. A height of the edge limb 12 corresponds to the distance of the guide limb 11 to the underside of the roof panel 2. In one embodiment, the edge limb 12 may be provided with an elastically flexible damping material D (shown diagrammatically in FIG. 4) at least in its end face or edge region facing the underside of the roof panel 2. The elastically flexible damping material D can either be produced by one-piece manufacture in the manufacturing process of the guide rail 10 as discussed above, or the damping material D can be subsequently applied to the edge limb 12 (as shown in FIG. 4) and connected to the edge limb 12 in a frictionally engaged, form-fitting or integrally bonded manner.

An upwardly facing inner side of the guide limb 11, a longitudinal side of the edge limb 12 pointing to the right in the plane of the drawing, and the underside of the roof panel 2 form a guide channel for the guide slider 9, said guide channel extending in the longitudinal direction of the glass roof arrangement 2. In the illustrated exemplary embodiment, the opposing guide rails 10 are oriented parallel to one another in their mounted operating state on the underside of the roof panel 2.

To fix the longitudinal profile forming the guide rail 10 to the underside of the roof panel 2, an adhesive bead K is provided laterally outside the guide channel of the guide rail 10 and thus offset laterally outwardly from the edge limb 12, and forms an adhesive layer for bonding the longitudinal profile to the underside of the roof panel 2. The adhesive bead K is dimensioned such that it fills a gap between the adhesive limb 13, the outwardly facing longitudinal side of the edge limb 12, and the underside of the roof panel 2 at least largely completely and over the surface. For an assembly of the guide rail 10, the adhesive bead K can already be continuously applied to the adhesive limb 13 before the longitudinal profile, i.e. the guide rail 10, is pressed from below against the underside of the roof panel 2. Alternatively, the adhesive bead K can be provided on the underside of the roof panel 2, and the longitudinal profile is pressed against the adhesive bead K. In both cases, once the adhesive bead K has cured, a stable connection between the guide rail 10 and the underside of the roof panel 2 is achieved. On the basis of FIG. 3, the orientations of the adhesive limb 13, the edge limb 12 and the guide limb 11 of the longitudinal profile are more strongly emphasized in order to be able to clearly recognize the longitudinal gap for the adhesive bead K on the one hand and the guide channel for the guide slider 9 on the other hand.

The invention claimed is:

1. A glass roof arrangement for a motor vehicle, the glass roof arrangement comprising:
   a support frame, the support frame having an operating state, the support frame in the operating state being mounted in a manner fixed on the motor vehicle by being fixedly connected to roof structure parts of a vehicle body of the motor vehicle;
   at least one transparent roof panel fixedly arranged on the support frame and having an underside;
   a shading device, disposed at the underside of the at least one transparent roof panel and having a shading structure; and
   guide rails fastened to the underside of the at least one transparent roof panel, the shading structure being displaceable longitudinally in and relative to the guide rails in a displacement direction, each guide rail having a guide profile cross-section, the shading structure having a pair of edge regions spaced-apart from one another in a direction transverse to the displacement direction, the shading structure being guided laterally in each of the guide profile cross-sections, each guide profile cross-section being formed by an edge limb oriented substantially orthogonally to the underside of the at least one transparent roof panel, and a guide limb extending substantially parallel to the underside of the at least one transparent roof panel and being attached to the edge limb, such that a lateral guide channel for the shading structure is formed and delimited by the underside of the at least one transparent roof panel, the edge limb, and the guide limb, the edge regions of the shading structure being slidably engaged within the respective lateral guide channels.

2. The glass roof arrangement according to claim 1, wherein each guide rail has an adhesive limb projecting from the edge limb in a direction opposite from a projection of the guide limb, the adhesive limb being positioned at a distance from the underside of the at least one transparent roof panel.

3. The glass roof arrangement according to claim 2, wherein the adhesive limb is positioned at a distance from the underside of the at least one transparent roof panel such that a gap is formed between the adhesive limb and the underside of the at least one transparent roof panel, the gap accommodating an adhesive bead.

4. The glass roof arrangement according to claim 3, wherein the distance of the adhesive limb from the underside of the at least one transparent roof panel is less than a distance of the guide limb from the underside of the at least one transparent roof panel.

5. The glass roof arrangement according to claim 1, wherein each of the guide rails comprises plastic.

6. The glass roof arrangement according to claim 1, wherein each of the edge limbs has an edge region facing the underside of the at least one transparent roof panel, the edge region including an elastically flexible damping material.

7. The glass roof arrangement according to claim 1, wherein the edge limb of each guide rail includes an inner surface facing sidewardly and inwardly, the guide limb of each guide rail includes an upper surface facing towards the underside of the at least one transparent roof panel, the inner surface of the edge limb, the upper surface of the guide limb and the underside of the at least one transparent roof panel together forming and delimiting the respective lateral guide channel.

8. The glass roof arrangement according to claim 7, wherein the lateral guide channels open inwardly towards one another and towards an interior of the motor vehicle.

9. The glass roof arrangement according to claim 1, wherein each edge limb has an upper edge region disposed immediately adjacent the underside of the at least one transparent roof panel.

10. The glass roof arrangement according to claim 9, wherein the upper edge region of each of the edge limbs includes a damping material disposed in direct contact with the undersigned of the at least one transparent roof panel.

11. A glass roof arrangement for a motor vehicle having a vehicle body with roof structure parts, said glass roof arrangement comprising:
   a support frame, said support frame, in a use state on the motor vehicle, being fixed to the roof structure parts thereof;
   a transparent roof panel fixed to said support frame and having an upper side and a lower side, said lower side facing opposite said upper side and towards an interior of the motor vehicle;
   a pair of guide rails fixed to said lower side of said transparent roof panel in a spaced-apart manner from one another, each said guide rail being elongated and having a longitudinal dimension; and a shading device disposed adjacent said lower side of said transparent roof panel and including a shading structure, said shading structure having a pair of edge portions disposed in spaced-apart relation with one another in a direction transverse to the longitudinal dimensions of said guide rails, each of said guide rails having a first limb oriented substantially orthogonally to said lower side of said at least one transparent roof panel, each said first limb having an upper edge portion disposed adjacent said lower side of said transparent roof panel and a lower edge portion spaced downwardly from said upper edge portion, each of said guide rails further including a second limb attached to said first limb adjacent said lower edge portion thereof and oriented substantially parallel to, and spaced downwardly from, part of said lower side of said transparent roof panel, said first limb, said second limb and said part of said lower side of said transparent roof panel together defining a guide channel, said guide channels of said guide rails opening towards one another, and said edge portions of said shading structure being slidingly engaged within the respective said guide channels such that said shading structure is displaceable along and relative to said guide rails.

12. The glass roof arrangement according to claim 11, wherein said first limb of each of said guide rails has oppositely facing first and second sides, said second limb being disposed at said first side of said first limb, each said guide rail comprising a third limb disposed at said second side of said first limb, said third limb being attached to said first limb adjacent said lower edge portion thereof, said second and third limbs of each said guide rail projecting from said first limb in opposite directions from one another.

13. The glass roof arrangement according to claim 12, wherein said third limb of each said guide rail is spaced downwardly from said lower side of said transparent roof portion such that a gap is formed between said lower side of said transparent roof portion and an upwardly facing surface of said third limb to accommodate a bead of adhesive.

14. The glass roof arrangement according to claim 13, wherein a distance defined between said lower side of said transparent roof portion and said upwardly facing surface of said third limb is less than a distance defined between an upwardly facing surface of said second limb and said part of said transparent roof panel.

15. The glass roof arrangement according to claim 11, wherein said upper edge portions of said first limbs are disposed in abutting relation with the respective said part of said lower side of said transparent roof panel, and each said upper edge portion includes a damping material.

16. A glass roof arrangement for a motor vehicle, said glass roof arrangement comprising:
  a support frame;
  a transparent roof panel having a peripheral edge portion fixed to said support frame, an upper side and a lower side, said lower side facing opposite said upper side and towards an interior of the motor vehicle;
  a pair of guide rails fixed to said lower side of said transparent roof panel in a spaced-apart manner from one another, each said guide rail having a longitudinal dimension; and
  a shading device including a shading structure, said shading structure having a pair of edge portions disposed in spaced-apart relation with one another in a direction transverse to the longitudinal dimensions of said guide rails, each of said guide rails having a first limb oriented substantially orthogonally to said lower side of said at least one transparent roof panel, each said first limb having an upper edge portion disposed adjacent said lower side of said transparent roof panel and a lower edge portion spaced downwardly from said upper edge portion, each of said guide rails further including a second limb attached to said first limb adjacent said lower edge portion thereof and oriented substantially parallel to, and spaced downwardly from, part of said lower side of said transparent roof panel, said first limb, said second limb and said part of said lower side of said transparent roof panel together defining a guide channel, and said edge portions of said shading structure being slidingly engaged within the respective said guide channels such that said shading structure is displaceable along and relative to said guide rails into a shading position, said shading structure in the shading position being disposed in superimposed relation with at least part of said transparent roof panel.

* * * * *